United States Patent [19]

Kollross

[11] Patent Number: 4,525,984

[45] Date of Patent: Jul. 2, 1985

[54] PROCESS AND DEVICE FOR PRODUCTION OF AN END CLOSURE ON A SHIRRED LENGTH OF TUBULAR MATERIAL, ESPECIALLY SYNTHETIC CASING FOR SAUSAGE MANUFACTURE

[76] Inventor: Günter Kollross, Am Wallerstadter Weg 20, D-6081 Dornheim, Fed. Rep. of Germany

[21] Appl. No.: 533,006

[22] Filed: Sep. 16, 1983

Related U.S. Application Data

[63] Continuation of Ser. No. 243,953, Mar. 2, 1981, abandoned.

[30] Foreign Application Priority Data

Jun. 30, 1979 [DE] Fed. Rep. of Germany ....... 2926543

[51] Int. Cl.$^3$ ............................................. A22C 13/00
[52] U.S. Cl. .......................................... 53/483; 17/42; 17/45; 17/49; 53/370; 493/121
[58] Field of Search ................. 17/49, 42, 45, 1 F, 17/1 R; 53/370, 483; 493/121

[56] References Cited

U.S. PATENT DOCUMENTS

| | | | |
|---|---|---|---|
| 3,162,893 | 12/1964 | Townsend | 17/34 |
| 3,274,005 | 9/1966 | Alsys | 17/49 X |
| 3,383,222 | 5/1968 | Alsys et al. | 17/49 X |
| 3,564,647 | 2/1971 | Matecki | 17/42 |
| 4,070,729 | 1/1978 | Tums et al. | 17/34 |

*Primary Examiner*—Willie G. Abercrombie
*Attorney, Agent, or Firm*—Larson and Taylor

[57] ABSTRACT

A method and device to close an open end of a length of shirred casing material. A shaft mounted on a housing is moved against the said opened end to engage the same and then turn about its axis to tighten an end portion of the casing material onto the shaft means. The shaft is then retracted, pulling some additional casing material outwardly from the shirred casing material until substantially no portion of the shaft means remains inside of the shirred casing material and the shaft no longer maintains pressure against the casing material. Then, the shaft is again turned in the same first direction to form a double walled twist, the free end of which wanders into the shirred casing material. When the twist has reached a predetermined length the turning movement in this first direction is stopped, and a further rod coaxial with the shaft pushes that twist fully into the interior of the shirred casing material, thereby tearing the tightened end of the casing material from the shaft. Separate drive means are provided from the shaft and the rod, all of which are mounted on a housing which is slideably mounted on a base. The housing and base are mounted adjacent a mechanism which holds and positions the length of shirred casing material.

24 Claims, 12 Drawing Figures

PROCESS AND DEVICE FOR PRODUCTION OF AN END CLOSURE ON A SHIRRED LENGTH OF TUBULAR MATERIAL, ESPECIALLY SYNTHETIC CASING FOR SAUSAGE MANUFACTURE

This is a continuation of application Ser. No. 243,953 filed Mar. 2, 1981, now abandoned.

The invention relates to a process for production of an end closure on a shirred length of tubular material, especially synthetic casing for sausage manufacture, by twisting off the tubular material that forms the last folds of the shirring by means of a tool that can be elastically presented against the end of the shirring and rotated coaxially thereto, said tool having a smaller radial dimension than the periphery of the shirred product, as well as to a device for execution of such a process.

Tubular shirrings of the mentioned type are largely used on stuffing machines in sausage manufacture. By the shirred shortening to a few decimeters, tube lengths of up to about 50 m can be pulled at one time onto the charging horn of a stuffing machine and filled, especially with sausage stuffing. Here, to avoid dead times, it is desirable that the tubular shirrings be already closed at one end when they are delivered so that the stuffing may begin immediately after the pulling of it onto the horn. It is generally known that such end closures can be produced by twisting off the tubular material itself, that constitutes the last folds of the shirring. Known processes for this have not shown themselves to be satisfactorily reliable against damage to the tubular material and acceptable sealing in the stuffing process, however.

Thus a known process works with a hooklike twisting tool that is introduced from the opposite end, through the shirring, and then it engages the tubular material by radial deflection and turning at the end that is to be closed, carrying the end along in the direction of rotation. Aside from the relatively long dead times for introduction and later retraction of the tool, there is the risk that the shirring will be damaged at its interior by the tip of the hook, or that the tubular material will not be engaged and twisted off.

A process of the type in question is also known (German OS No. 23 17 867) in which the twisting off occurs on a thin rod centrally introduced previously by the twisting tool into the shirring, which rod at the conclusion of the operation is again withdrawn from the twist that is formed. The twisting tool in this instance is a device with an arrangement of a plurality of twist plates disposed with their edges on a conical generatrix, which plates are applied during the whole twisting operation with essentially uniform pressure against the shirring end, and in their rotation about the axis of the shirring they effect a continuous pulling out of the last folds of the end of the shirring and the twisting thereof on the rod. Depending upon the free length of the rod, an end closure is obtained that is permeable or impermeable to the enclosed air. The number of twists is limited however, and offers no adequate ensuracne of a reliable seal against escape of the stuffing. If on the other hand the number of twists is increased there is the risk that the tubular material will tear.

The invention therefore relates to the problem of further developing a process of the kind in question, so that the number of twists can be substantially increased without danger of a tear and with complete seal.

The solution of this problem according to the process of the invention is that first by a few rotations of the tool pressed against the shirring end, the tubular material there is caused to cling with twisting to the periphery of the tool, and thereupon the tool is pulled back a short distance and with further turning of the tool a coreless twist is formed on the adjoining tubular material that moves into the interior of the shirring, and finally the tool is completely withdrawn from the tubular material.

The invention rests on the knowledge that a damage-free twisting of the tubular material with an adequate number of turns, between about 20 or 30, is only possible if the folds of the shirring can be continuously drawn out without pressure, in conjunction with an unanticipated finding that with appropriate design of the tool, a few initial rotations with pressure are sufficient to draw the end of the tubular material onto the tool periphery with twisting, so that the tool can then be pulled back a short distance without danger of its falling off the tool during the subsequent rotations. After completion of the twisting a complete withdrawal of the tool and detachment of it from the tubular material is possible, which may be still further promoted in that in an advantageous arrangement of the invention the direction of rotation of the tool for release of its engagement with the tubular material can be briefly reversed.

It is clear that with the process according to the invention, a double-walled twist is formed whose turns are continuously braced on the turns already formed without—as in the known—need for introduction of a special rod into the shirring which in most cases leaves behind an unwanted opening in at least part of the twist, whereby at the same time the number of turns inside the shirring can be increased as desired, and thereby an acceptable seal for later filling can be produced.

In another advantageous arrangement of the process according to the invention, it is recommended that the rotation of the tool in withdrawal be sustained for a short distance, whereby dead times that otherwise occur in the transitory stopping of the tool can be avoided.

Still another characteristic of the invention process provides that the twist be separately thrust so deeply into the shirring in the removal of the tool that the tube end will be entirely taken up by the shirring. Obviously, thereby an axial protrusion of the widened twist end with which the tool has first engaged the tubular material will be avoided.

In a tubular shirring whose folds lie on a conical generatrix so that one shirring end assumes the form of a protruding truncated cone and the other end is correspondingly in the form of a hollow cone, the engaging of the tubular material by the tool is further promoted in that the shirring is closed at the hollow-cone end.

A device for execution of the process according to the invention is then characterized basically by a rotatable and axially displaceable mandrel with a friction-engaging promoting outer periphery. For this the mandrel can be made as a multisided, preferably a four-sided piece. However it is also possible to provide the mandrel with cylindrical grooved, milled or roughened peripheral surface.

Other characteristics of the advantageous embodiment of the device according to the invention appear in subclaims 9 to 23.

The invention is discussed in detail below in connection with an example of embodiment shown in the drawing, of a twist-off device.

Figure 1:
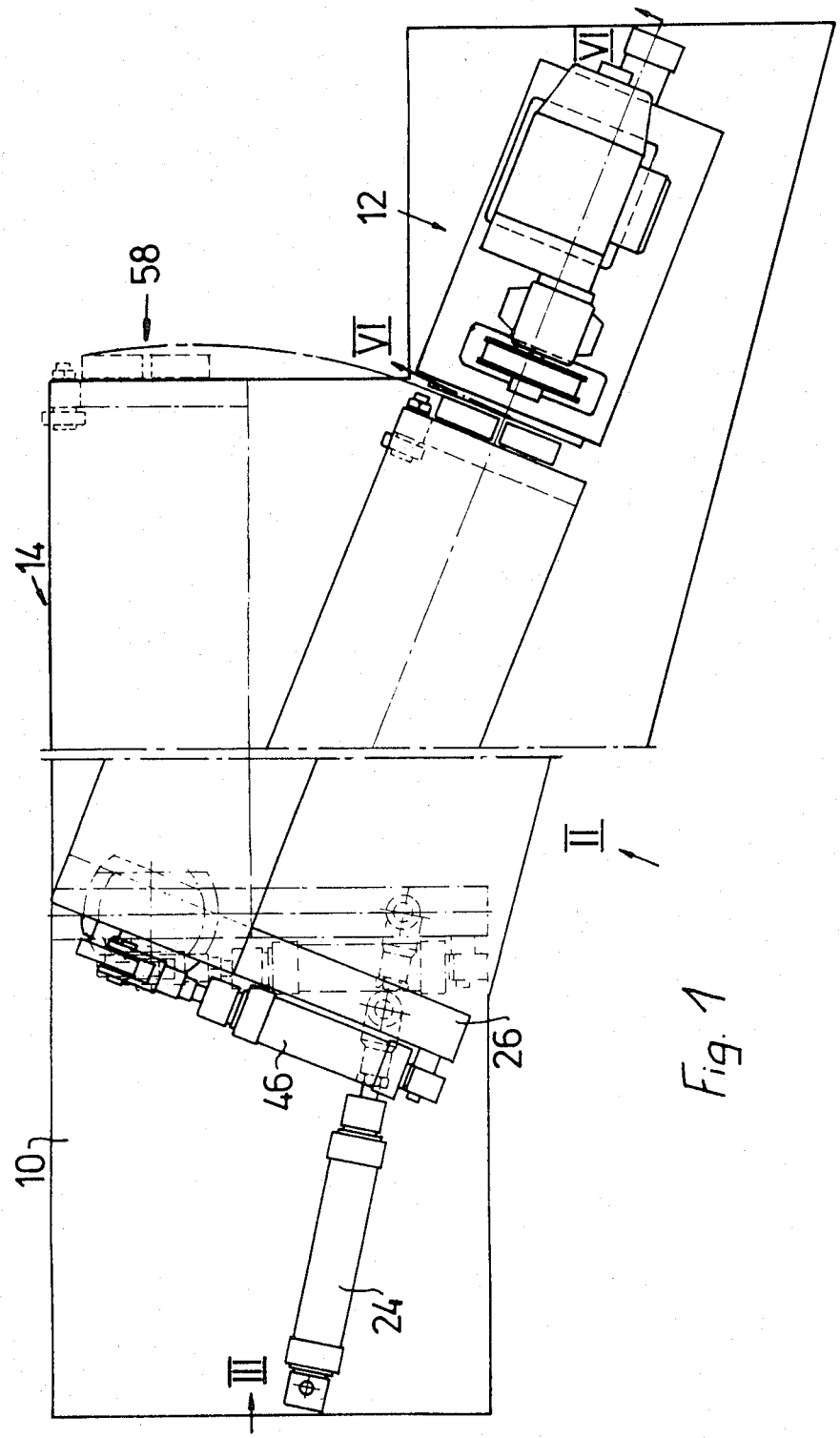
FIG. 1 shows a top view of the device.
Figure 3:
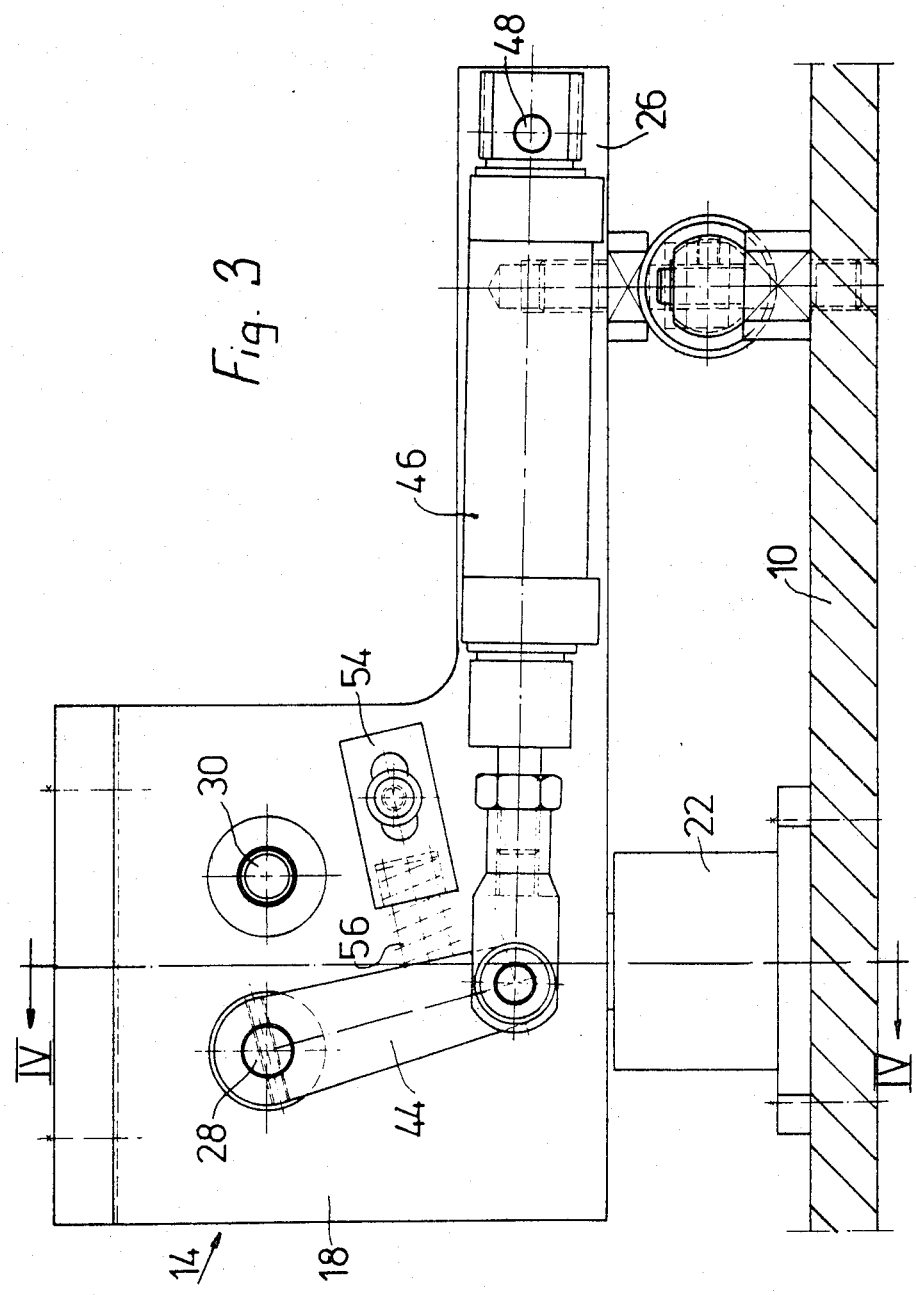
FIG. 3 is a frontal view in a larger scale of one end of the shirring holding device in the direction of arrow III of FIG. 1.
Figure 4:
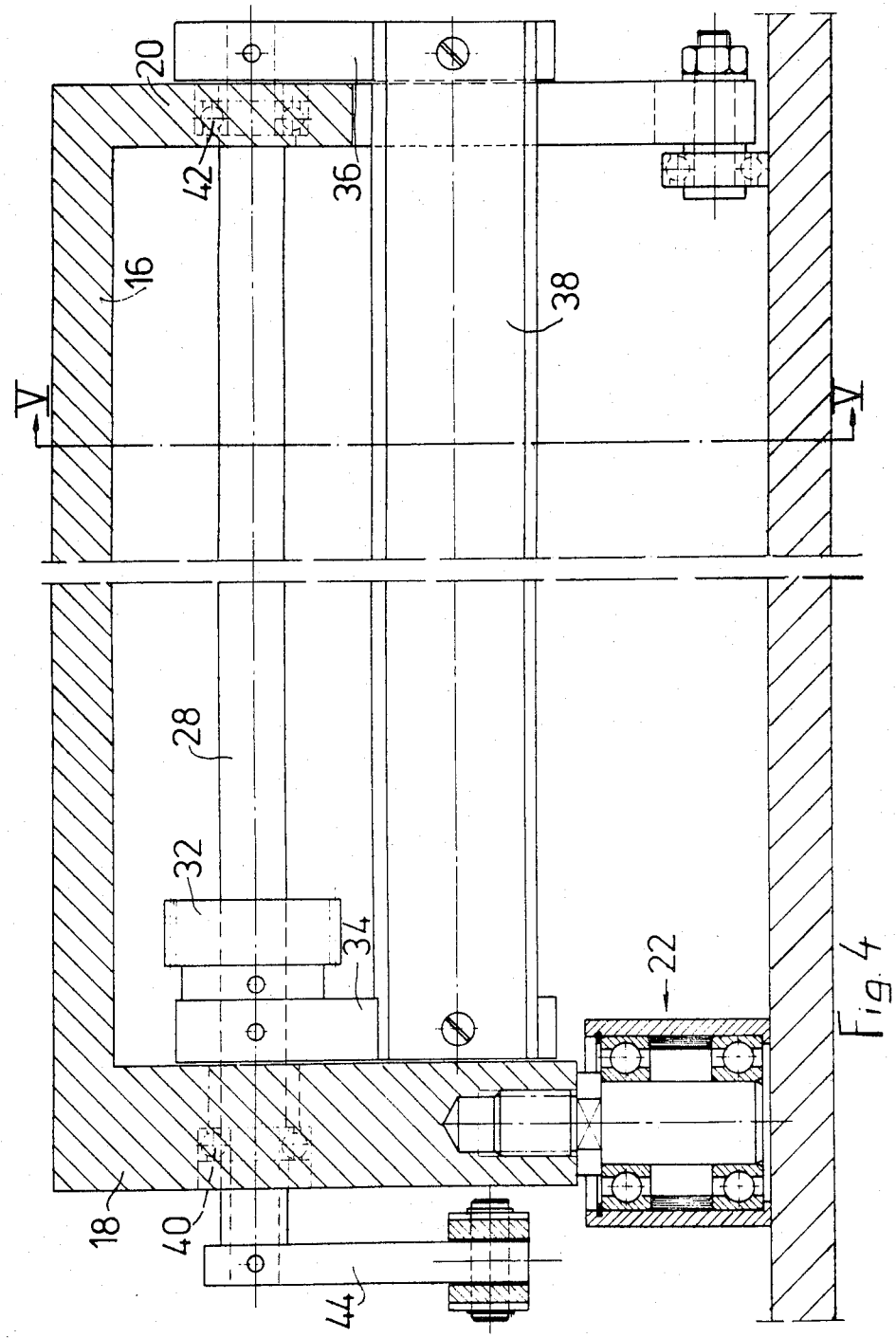
FIG. 4 is a longitudinal section through the shirring holding device along line IV—IV of FIG. 3.
Figure 5:
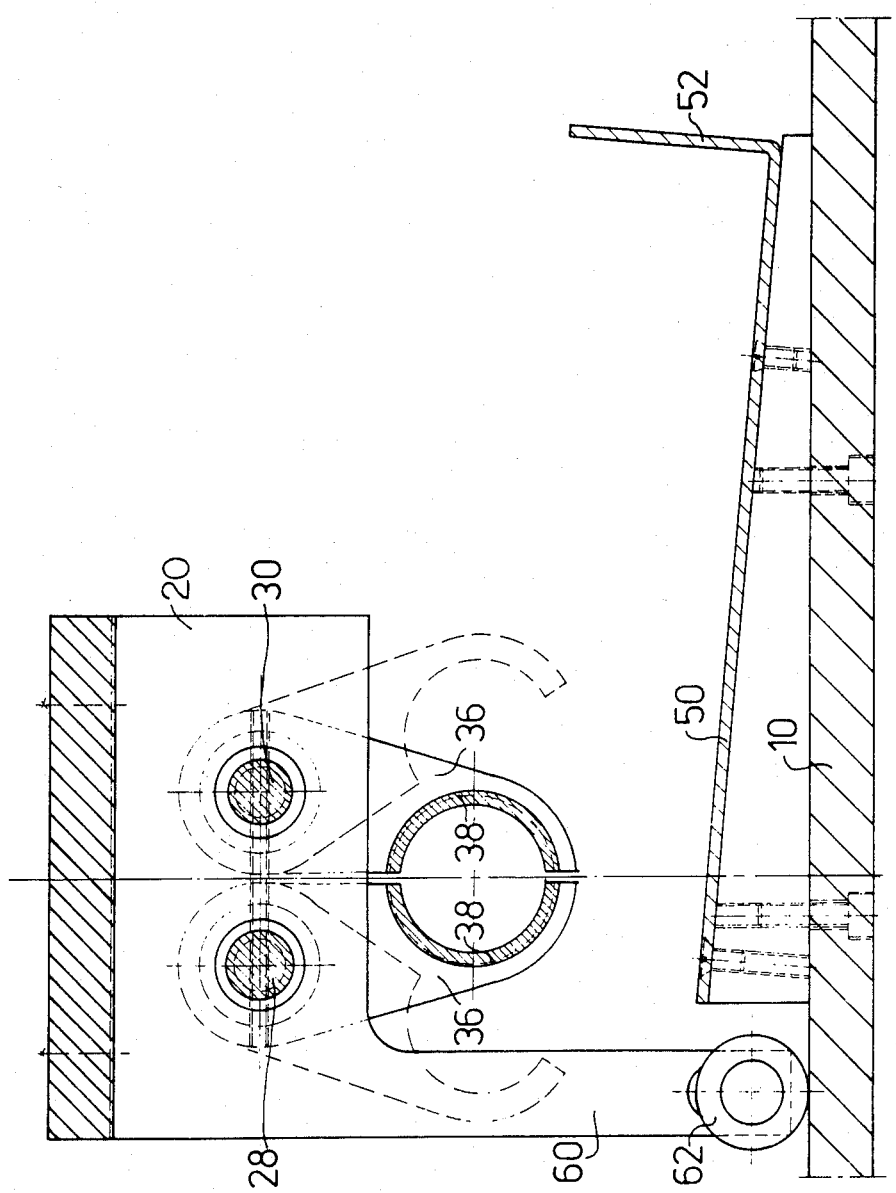
FIG. 5 is a cross section through the shirring holding device along line V—V of FIG. 4
Figure 6:
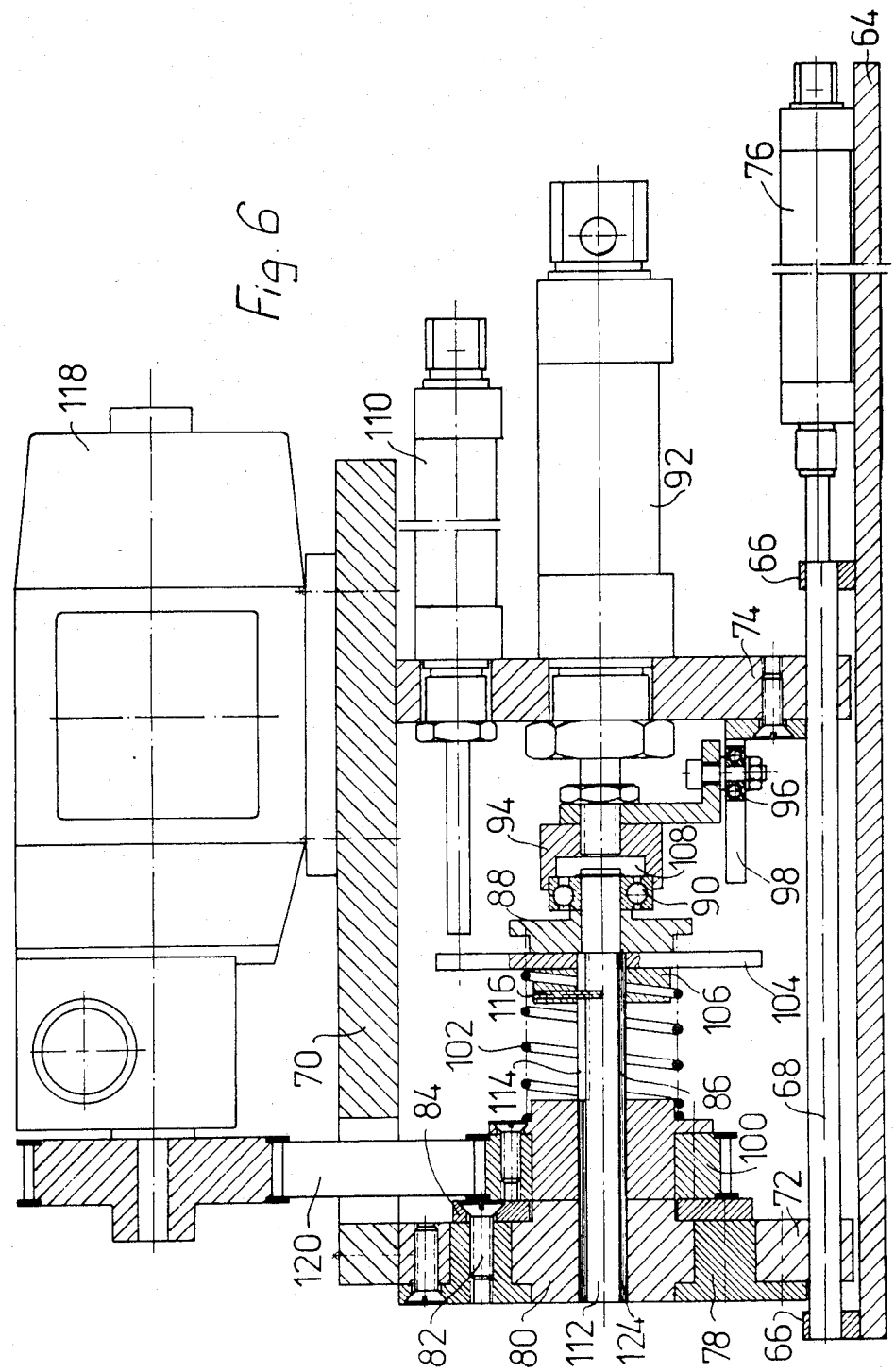

FIG. 6 on the same scale as in FIGS. 3–5 is a longitudinal section through the twisting unit along line VI—VI of FIG. 1

Figure 7:
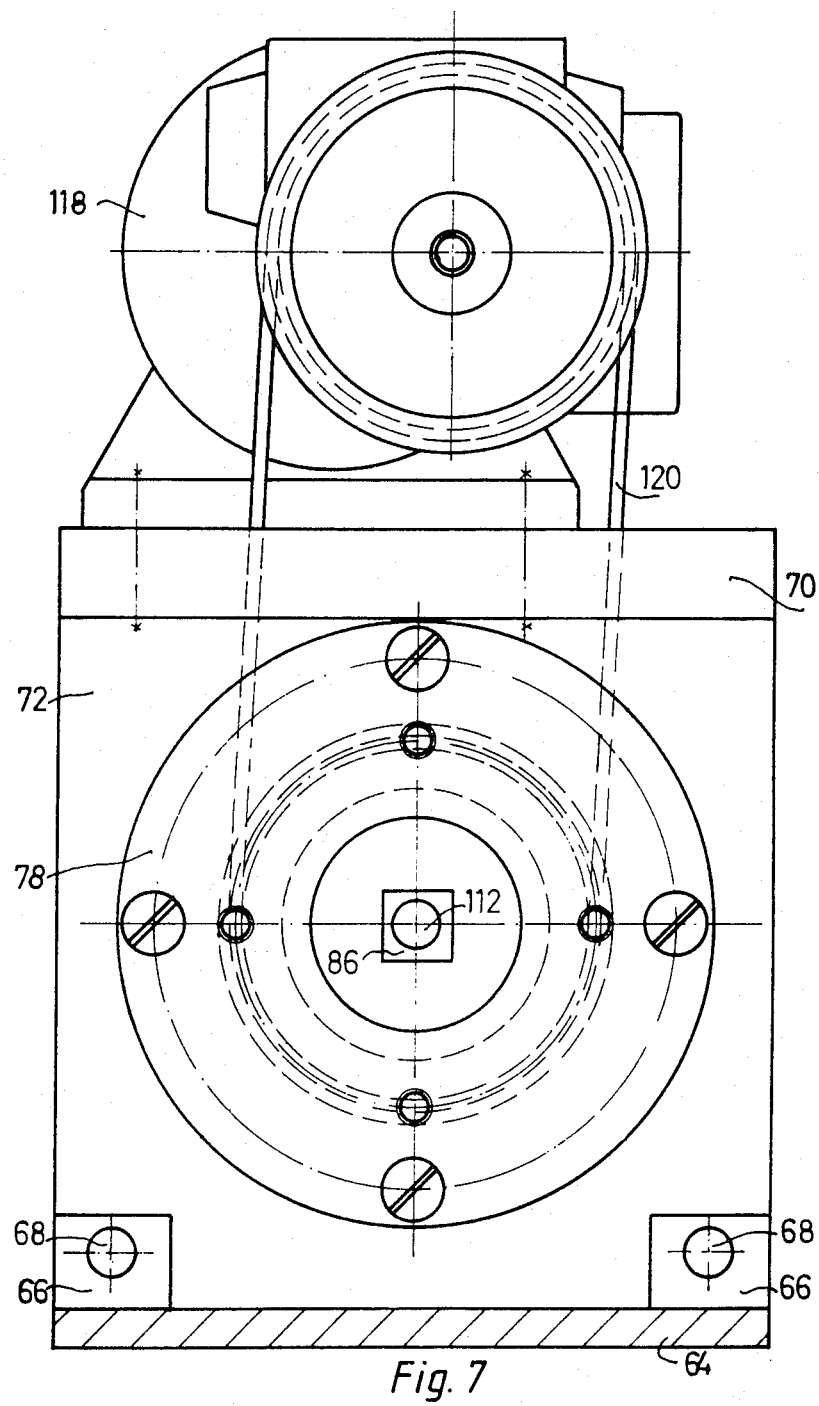

FIG. 7 is a frontal view of the twist-off unit in the direction of arrow VIII in FIG. 6, and FIGS. 8a–e show various phases of the twisting process, in a schematic representation.

Figure 2:
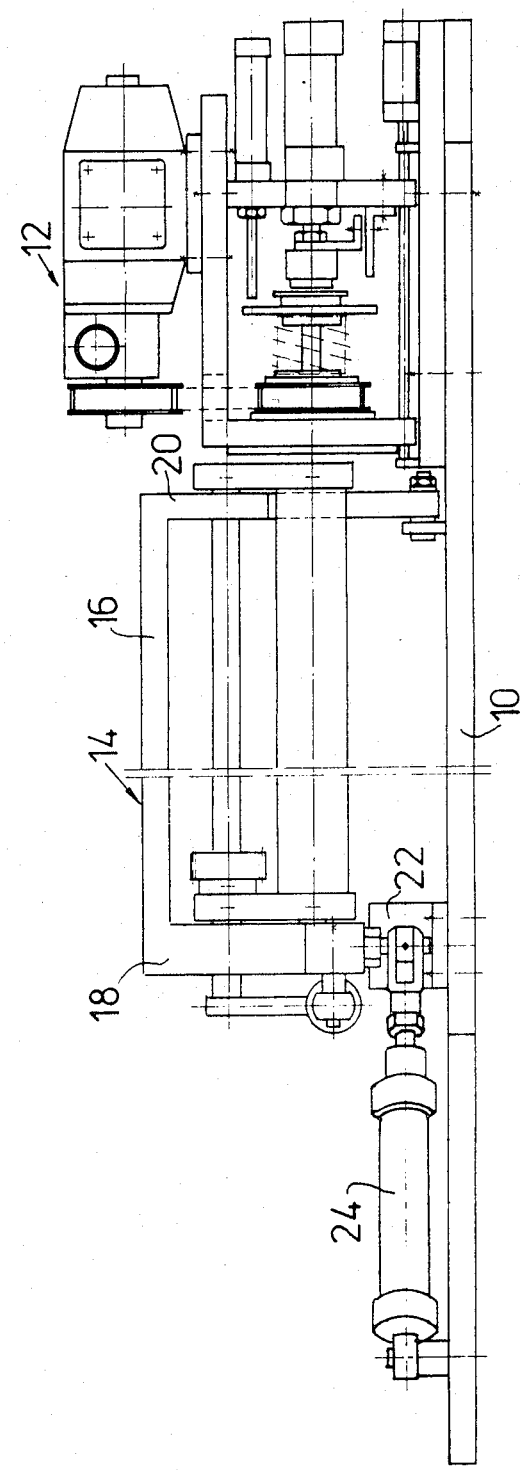
FIG. 2 is a view of the device in the direction of arrow II of FIG. 1.

According to the illustration of FIGS. 1 and 2, there are disposed on a base plate 10 a twist-off unit that is given the overall designation of 12, and a shirring holding device that is given the overall designation of 14.

The shirring holding device 14 comprises, as FIGS. 2 and 4 show, a boxlike frame open at the bottom with an upper wall 16 and two side walls 18, 20 of unequal length, whereof the longer side wall 18 is borne, by means of a pedestal bearing 22 that consists of ball bearings, on base plate 10 in such a way that the shirring holding device 14 can be swung between a receiving position indicated in dot-and-dash in FIG. 1 and a twist-off and ejection position indicated there in solid lines. For execution of the swinging motion there is a power cylinder 24 that is articulated with its housing part on base plate 10 and with its piston rod on a crossarm 26 of the shirring holding device 14 that is made as one piece with side wall 18.

Two shafts 28, 30 extend through box frame 16, 18, 20 with a spacing between them, which are coupled with each other by gears 32 (FIG. 4) so as to run counter to each other. Shafts 28, 30, on the inside of the side wall 18 and the outside of side wall 20, present downwardly directed levers, disposed in pairs with jaw openings opposed to each other below side wall 20, in which elongated half shells 30 are fixed, which together constitute an essentially cylindrical receiver for the shirring.

Shafts 34, 36 are borne by ball bearings 40, 42 in the side walls 18 and 20 respectively of the box frame (FIG. 4). Shaft 28 is extended out beyond side wall 18 and presents a lever 44 on which a power cylinder 46 engages articulatedly, its housing being articulated to crossarm 26 at 48. By means of power cylinder 26, the half shells can be swung between a closed position shown in FIG. 5 with solid lines, as required for twisting, and a fully open position that is indicated by dash lines in FIG. 5, in which position the half shells release the previously engaged shirring and let it fall on a sloped catching sheet 50 fastened on base plate 10, on which the twisted-off shirrings roll to an edge 52 where they can be taken off by the machine operator.

As FIG. 3 shows, side wall 18 of the box frame has a spring retaining device 54 with a spring 56 that is applied with tension against lever 44 and constantly urges half shells 38 apart. By virtue of this arrangement, when the double acting power cylinder 46 is released from load of actuating pressure after the closing of the shirring receiving device constituted by half shells 38, it will open them slightly so that in the illustrated receiving position shown in dashed lines in FIG. 1, a shirring that is to be twisted off can be thrust axially into the shirring receiver, in the direction of arrow 58. This can be done manually or by means of suitable devices on a shirring machine on which the device shown in the drawings can be built.

After receiving the shirring that is to be twisted off, the shirring receiver is closed by renewed pressure of power cylinder 46, and the whole shirring holding device 14 will be swung by means of power cylinder 24 into the position illustrated in solid lines in FIG. 1, in which one end of the held shirring comes into position before the twist-off unit 12 which is described below. In order to guide the shirring holding device 14 in the course of the swinging, side wall 20 can be provided with an extension 60 (FIG. 5) on the end of which a roll 62 is borne that braces on base plate 10.

According to the illustration of FIGS. 1, 6 and 7, twist-off device 12 presents a separate base plate 64 fixed on base plate 10, on which two parallel guide rods 68 are disposed with supports 66. Guide rods 68 constitute a guide for a box frame comprising an upper wall 70 and two side walls 72, 74, which can be moved by means of a power cylinder 76 that engages side wall 74 between guide rods 68 and is fixed with its housing on base plate 64, between the work position shown in FIG. 6 and a retracted position.

Side wall 72 of box frame 70, 72, 74 receives a bearing shell 78 in a relatively large opening, in which bearing shell a thickwalled plate 80 is borne and is secured against axial displacement by means of a ring plate 84 fixed to bearing shell 78 with bolts 82.

Plate 80 has a central square-cross section perforation through which shaft means in the form of a a four-sided shaft 86 extends displaceably with one end. The other end of the four-sided shaft 86 is cylindrical and presents a pressure plate 88 as well as a ball bearing 90, on whose outer ring the piston rod of a power cylinder 92 set with its housing in a bore of side wall 74 engages via a cup-shaped bearing shell 94. An angle lever fixed on the piston rod of the power cylinder 92 behind the bearing shell 94 presents a ball bearing 96 at its bent down end, that rolls down in a fork piece fixed to the side wall 74 and thereby secures the piston rod of the power cylinder 92 against twisting.

On four-sided shaft 86 there is further slidably disposed a pulley 100 in connection with the thick-walled plate 80, held by a compression spring 102 against ring plate 84. The other end of compression spring 102 is braced against a plate 104 that is slidably disposed on four-sided shaft 86 by means of a hub 106 fixed on the side plate and that in turn is braced against pressure plate 88 which is held via the inner race of ball bearing 90 by a circlip 108, in position on the cylindrical end of the four-sided shaft 86.

A power cylinder 110 fixed in another hole of side wall 74 is directed with its piston rod against the edge zone of plate 104, and can move the said plate with hub 106 against the pressure of spring 102, on the four-sided shaft. Four-sided shaft 86 is further provided with a cylindrical hole in which a rodlike ram 112 is slidable. Said ram is connected with hub 106 by means of a pin 116 that passes through a slot 114 in four-sided shaft 86. The length of the ram 112 is such that when the power cylinder 110 is inoperative it is entirely retracted into the hole of four-sided shaft 86.

A reversible electric drive motor 118 is fixed on the upper wall 70 of box frame 70, 72, 74. It has a pulley 120 on its drive shaft that is in driving connection via a belt, advantageously a studded belt 120, with pulley 100.

The operation of the above described device is as follows. First, as described above, a tubular shirring that is to be twisted off is thrust in the direction of arrow 58 into the shirring holding device in its receiving position (dashed lines in FIG. 1) between the half shells 38 that are slightly spread apart by the action of spring 56. Insofar as the tubular shirring that is to be twisted off has been shirred with formation of conical folds, the shirring is thrust in which the truncated conical end outward. Hereupon the shirring receiver constituted by half shells 38 is closed by actuation of power cylinder 46, and shirring holder 14 is swung by actuation of power cylinder 24 into the twist-off position indicated in solid lines in FIG. 1, whereby the hollow cone end of the held shirring arrives in front of the end of four-sided shaft 86 that is retracted into plate 80. Twist-off unit 12 is thereby in a retracted position, by suitable actuation of power cylinder 76. By actuation of power cylinder 46 that acts on the shells 38, the shirring is held against twisting and axial displacement over its whole length, firmly between the half shells. In this position four-sided shaft 86 assumes the position shown with respect to the tubular shirring in FIG. 8a.

Figure 8A:
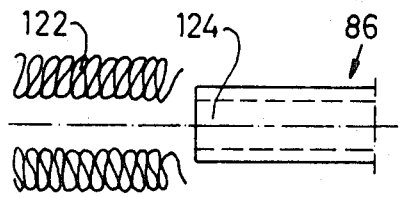
Figure 8B:
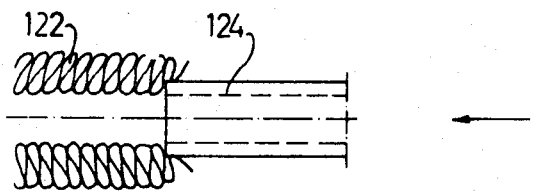

The power cylinder 92 moves the free end of 4-sided shaft 86 outwardly of the plate 80. The power cylinder 76 then moves the entire unit forwardly on guide rods 68, causing the 4-sided shaft 86 to press into the hollow conical end of the shirring, as shown in FIG. 8b. The four-sided shaft is of such design that its major radial extent is substantially less than the outer periphery of the tubular shirring. Thereby the forward end 124 of four-sided shaft 86 that constitutes the twist-off tool penetrates relatively deeply into the tubular shirring, as shown in FIG. 8b, and the tubular material outside this zone arrives on the outer periphery of the four-sided shaft.

Figure 8C:
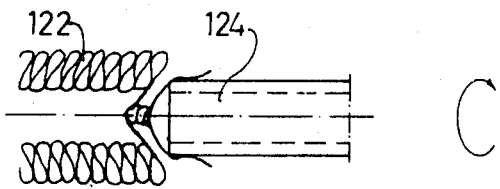
Figure 8D:
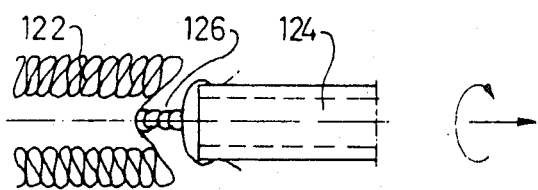
Figure 8E:
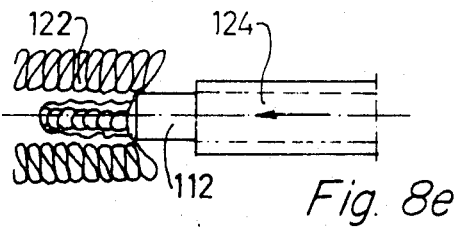

Now drive motor 118 is switched on and the mentioned tubular material clings to the outer periphery of the forward end 124 of the four-sided shaft, while at the same time the adjoining tubular material forms a twist 126 during a few rotations, that is short at first (FIG. 8c). After these few rotations the power cylinder 76 is actuated in reverse and pulls twist-off unit 12 further back (FIG. 8d). The active stroke of the power cylinder 76 is limited by stops (not shown) to a few millimeters, e.g. 5 mm. During this retracting motion and thereafter, drive motor 118 remains switched on, and the rotating four-sided shaft 86 takes more tubular material from the shirring folds and twists it to form a twist that continuously moves into the shirring, without thereby having the end 124 of four-sided shaft 86 press against the tubular shirring.

After a sufficient number of turns, drive motor 118 is stopped and power cylinder 110 is actuated, whereby ram 112 is thrust out of the four-sided shaft and takes the tube end from the forward end 124 of of the four-sided shaft 86 and forces it into the shirring 122. To facilitate the pulling off, drive motor 118 may be briefly switched on in the opposite direction. Thereupon four-sided shaft 86 will again be retracted into plate 80 by actuation in reverse of power cylinder 92, whereby at the same time power cylinder 110 is also actuated in the reverse direction and plate 104 is released, with hub 106, which pulls ram 112 back into four-sided shaft 86 by the action of compression spring 102. The twist-off unit is thus once more in the starting position, and half shells 38 are completely opened by actuation of power cylinder 46, whereby the twisted-off shirring is thrown off onto catching plate 50. The shirring holding device swings by suitable actuation of power cylinder 46 back into the receiving position and is ready to receive a new shirring.

It is obvious that the above described course of operation can be fully automatically controlled within the specific work cycle. For this purpose, the double-acting power cylinders are furnished with electromagnetically actuatable valves. To actuate the power cylinder, compressed air is advantageously utilized. It is conceivable however that actuation could be effected with compressed fluid.

I claim:

1. A method of closing off an end of a length of shirring casing material, such as synthetic casing material used for making sausages, comprising the steps of:
    moving a shaft means coaxially relative to the said length of shirred casing material against the last shirrs of the shirred material at an open end thereof, wherein the largest cross-sectional dimension of the shaft means is smaller than the outer diameter of the length of shirred casing material and larger than the inside diameter of the length of shirred casing material,
    maintaining the pressure of the shaft means against the casing material and turning the shaft means for as many revolutions as are required to tighen an end portion of the casing material onto the shaft means, and then stopping the turning of the shaft means in said first direction,
    retracting the shaft means relative to the length of shirred casing material, until substantially no portion of the shaft means remains inside of the length of shirred casing material, and the shaft means no longer maintains pressure against the casing material,
    starting the turning movement of the shaft means again in said first direction to form a double walled twist, stopping the turning movement in said first direction, and,
    then pushing the casing material coaxially back into the length of shirred casing material,
    and retracting the shaft means from the shirred length of casing material.

2. A method according to claim 1, wherein said step of retracting the shaft means includes moving the shaft means away from the shirred length of casing material while turning the shaft means in a reverse direction, opposite to the direction of turning during twisting.

3. A method according to claim 2, wherein the turning of the shaft means in the reverse direction is maintained during the entire retracting movement until the shaft means is completely released from the shirred length of casing material.

4. A method according to claim 1, wherein the step of pushing the casing material includes pushing it into the shirred casing material to a depth such that the inner end thereof is completely embedded in the length of shirred casing material after it is detached from the shaft means.

5. A method according to claim 4, wherein the length of shirred casing material has a conical open end, and the said moving step includes moving the shaft means against the last conical fold of the shirred length of casing material.

6. A method according to claim 1, wherein the said step of moving the shaft means comprises moving a rectangular cross-sectional shaft, the diagonal of which is the said largest cross-sectional dimension, and the said pushing step comprises moving an inner rod mounted within the rectangular cross-sectional shaft and mounted coaxially therewith.

7. A device for closing off an end of a length of shirred casing material, such as synthetic casing material for making sausage, comprising:
a housing including a shaft means mounted thereon and positionable coaxially relative to the length of shirred casing material, adjacent an open end thereof, said shaft means being rotatable about its axis and movable axially into and out of the open end of the length of shirred casing material to engage an end portion of the casing material, and retract that end portion out of the length of casing material, the largest cross-sectional dimension of the shaft means being less than the outer diameter of the length of shirred casing material but larger than the inside diameter of the length of shirred casing material,
and including an inner rod means movable along the axis of the shaft means, independently thereof, for urging the end portion back into the inside of the length of shirred casing material.

8. A device according to claim 7, including: a base, said housing being mounted on the base for movement axially relative to the shaft means.

9. A device according to claim 8, said shaft means being movable axially relative to said housing to a position to engage the open end of the length of shirred casing material.

10. A device according to claim 9, said inner rod means mounted within the shaft means and movable axially relative thereto, and including separate axial drive means for each of the outer portion of the shaft means and the inner rod means.

11. A device according to claim 7, said shaft means being of polygonal cross-section.

12. The device according to claim 7, said shaft means including roughening on the exterior thereof.

13. A device according to claim 7, including a piston and cylinder means for moving the rod means in the direction towards the casing material and a spring means for urging the rod means in the return direction.

14. A device according to claim 7, including a gear wheel surrounding said shaft means, said gear wheel being mounted on the shaft means for rotation therewith, but said shaft means being slideable axially relative thereto.

15. A device according to claim 14, including a drive means for said gear wheel and a belt means interconnecting the drive means and the gear wheel.

16. A device according to claim 14, said rod means engaging said shaft means via an axial thrust bearing.

17. A device according to claim 7, said shaft means having an axial bore for receiving said rod means.

18. A device according to claim 17, said shaft means having an elongated slot through which said rod means is coupled with a member which can slide relative to the shaft eans.

19. A device according to claim 18, said member comprising a sleeve-shaped hub which includes eccentrically mounted means engaging the rod means and axially movable along the shaft means opposing the force of a return spring which acts upon the rod means to return the same in a direction away from the casing material.

20. A device according to claim 7, including a rigid mounting support which grips the shirred casing material about its circumference to support the same along most of its length, said support including a pair of elongated half shells.

21. A device according to claim 20, said half shells being mounted onto levers of a two-way slave cylinder and movable in opposite directions away from each other.

22. A device according to claim 21, said levers being mounted on shafts which are arranged side by side above the half shells.

23. A device according to claim 21, including spring means for normally urging the half shells to an open position, separated from each other to release the shirred casing material.

24. A device according to claim 20, said mounting support being shiftable between a receiving position for receiving a shirred length of casing material and a twisting position at which the end of the shirred length of casing material is coaxial with said shaft means.

* * * * *